United States Patent  
Xu et al.

(10) Patent No.: US 11,041,114 B2
(45) Date of Patent: Jun. 22, 2021

(54) METHODS AND TREATMENT FLUIDS FOR MICROFRACTURE CREATION AND MICROPROPPANT DELIVERY IN SUBTERRANEAN FORMATIONS

(71) Applicant: Multi-Chem Group, LLC, Houston, TX (US)

(72) Inventors: Liang Xin Xu, The Woodlands, TX (US); Kai He, Houston, TX (US); Paul David Lord, Cypress, TX (US); Philip Nguyen, Houston, TX (US)

(73) Assignee: Multi-Chem Group LLC, Houston, TX (US)

( * ) Notice: Subject to any disclaimer, the term of this patent is extended or adjusted under 35 U.S.C. 154(b) by 0 days.

(21) Appl. No.: 16/489,900

(22) PCT Filed: Apr. 4, 2017

(86) PCT No.: PCT/US2017/025978
§ 371 (c)(1),
(2) Date: Aug. 29, 2019

(87) PCT Pub. No.: WO2018/186840
PCT Pub. Date: Oct. 11, 2018

(65) Prior Publication Data
US 2020/0024508 A1  Jan. 23, 2020

(51) Int. Cl.
*E21B 43/267* (2006.01)
*C09K 8/80* (2006.01)
(Continued)

(52) U.S. Cl.
CPC .................. *C09K 8/80* (2013.01); *C09K 8/52* (2013.01); *C09K 8/602* (2013.01); *C09K 8/605* (2013.01);
(Continued)

(58) Field of Classification Search
CPC ............ C09K 8/80; C09K 8/52; E21B 43/267
(Continued)

(56) References Cited

U.S. PATENT DOCUMENTS

2005/0092489 A1  5/2005  Welton et al.
2005/0274517 A1  12/2005  Blauch et al.
(Continued)

FOREIGN PATENT DOCUMENTS

WO    2015/152919 A1    10/2015

OTHER PUBLICATIONS

Xu, Liang, et al. "Spontaneously imbibed fluids for increasing contact area between hydraulic fracturing fluids and formation matrix in liquids-rich shale plays." SPE Liquids-Rich Basins Conference-North America. Society of Petroleum Engineers, 2015.
(Continued)

*Primary Examiner* — Zakiya W Bates
*Assistant Examiner* — Ashish K Varma
(74) *Attorney, Agent, or Firm* — Tenley Krueger; Baker Botts L.L.P.

(57) ABSTRACT

Systems, methods, and compositions for creating microfractures within subterranean formations and delivering microproppant particles into microfractures within subterranean formations are provided. In some embodiments, the methods include: providing a treatment fluid that comprises an aqueous base fluid, a surfactant, and a plurality of microproppant particles having a mean particle diameter of about 100 microns or less; introducing the treatment fluid into a subterranean formation at or above a pressure sufficient to initiate the formation of at least one microfracture within the subterranean formation; and allowing at least a portion of the microproppant particles to enter the at least one microfracture within the subterranean formation.

20 Claims, 6 Drawing Sheets

(51) Int. Cl.
 C09K 8/52 (2006.01)
 C09K 8/60 (2006.01)
 C09K 8/68 (2006.01)
 E21B 37/06 (2006.01)
(52) U.S. Cl.
 CPC ............. *C09K 8/68* (2013.01); *E21B 37/06* (2013.01); *E21B 43/267* (2013.01); *C09K 2208/12* (2013.01); *C09K 2208/28* (2013.01)
(58) Field of Classification Search
 USPC ...................................................... 166/280.2
 See application file for complete search history.

(56) References Cited

U.S. PATENT DOCUMENTS

| | | | |
|---|---|---|---|
| 2006/0118299 | A1 | 6/2006 | Nguyen et al. |
| 2012/0125617 | A1* | 5/2012 | Gu ..................... E21B 43/26 166/308.1 |
| 2013/0284437 | A1* | 10/2013 | Nguyen ............... E21B 43/267 166/280.1 |
| 2014/0034309 | A1* | 2/2014 | Saini .................... E21B 43/267 166/280.1 |
| 2016/0053160 | A1* | 2/2016 | Nguyen .............. C09K 8/5751 166/308.5 |

OTHER PUBLICATIONS

Feng, Lijie, and Liang Xu. "Implications of shale oil compositions on surfactant efficacy for wettability alteration." SPE Middle East Unconventional Resources Conference and Exhibition. Society of Petroleum Engineers, 2015.

Aderibigbe, Aderonke Abiodun, and Robert H. Lane. "Rock/fluid chemistry impacts on shale fracture behavior." SPE International Symposium on Oilfield Chemistry. Society of Petroleum Engineers, 2013.

Dunning, Jeremy D., Wardell L. Lewis, and David E. Dunn. "Chemomechanical weakening in the presence of surfactants." Journal of Geophysical Research: Solid Earth85.B10 (1980): 5344-5354.

Karfakis, M. A., and M. Akram. "Effects of chemical solutions on rock fracturing." International journal of rock mechanics and mining sciences & geomechanics abstracts. vol. 30. No. 7. Pergamon, 1993.

Kim, Taek-Soo, Tomohisa Konno, and Reinhold H. Dauskardt. "Surfactant-controlled damage evolution during chemical mechanical planarization of nanoporous films." Acta Materialia 57.16 (2009): 4687-4696.

Xu, Liang, Kai He, and Christina Nguyen. "Insights into surfactant containing fracturing fluids inducing microcracks and spontaneously imbibing in shale rocks." SPE/CSUR Unconventional Resources Conference. Society of Petroleum Engineers, 2015.

International Search Report and Written Opinion issued in related PCT Application No. PCT/US2017/025978 dated Dec. 22, 2017, 14 pages.

Dahl, Jeff, et al. "Application of micro-proppant to enhance well production in unconventional reservoirs: laboratory and field results." SPE Western Regional Meeting. Society of Petroleum Engineers, 2015.

Xu, Liang. (2013). Weakly Emulsifying Surfactant Reduces Formation Damage and Enhances Well Productivity in Acid Stimulation. 10.2118/165348-MS.

Office Action issued in related Canadian Application No. 3053107 dated Apr. 8, 2021, 8 pages.

* cited by examiner

METHODS AND TREATMENT FLUIDS FOR MICROFRACTURE CREATION AND MICROPROPPANT DELIVERY IN SUBTERRANEAN FORMATIONS

CROSS-REFERENCE TO RELATED APPLICATION

The present application is a U.S. National Stage Application of International Application No. PCT/US2017/025978 filed Apr. 4, 2017, which is incorporated herein by reference in its entirety for all purposes.

BACKGROUND

The present disclosure relates to systems, methods, and compositions for treating subterranean formations.

In certain low permeability or "tight" formations, such as shale, tight gas, clay, and coal bed formations, fracturing stimulation is often used to enhance production of fluids such as oil and gas from the formation. A fracturing stimulation in shale or other similar formation not only forms primary fractures in the near field around the wellbore, but also may form induced, dendritic fractures (sometimes referred to as "microfractures") in the far field regions extending from the primary fractures. These induced, dendritic fractures are generally formed at the tip and edges of the primary fractures, and extend outwardly in a branching tree like manner from the primary fractures. Because these secondary, dendritic fractures can extend transversely to the trajectory of the primary fractures, they may reach and link natural fractures both in and adjacent to the trajectory of the primary fractures. As such, they may reach a larger portion of the naturally occurring fracture network, and link the natural fractures back to the primary fractures and to the well. Shale, coal and many other low permeability formations, for example, formations having a permeability of approximately 1 millidarcy (mD) or less, may fracture in this manner.

In certain treatments, small sized proppant particles such as microproppant particles have been described and/or used to prop open these microfractures within tight formations, among other reasons, to facilitate the flow of fluids through those microfractures and improve the recovery of those fluids from the formation.

BRIEF DESCRIPTION OF THE DRAWINGS

These drawings illustrate certain aspects of some of the embodiments of the present disclosure, and should not be used to limit or define the claims.

Figure 1:
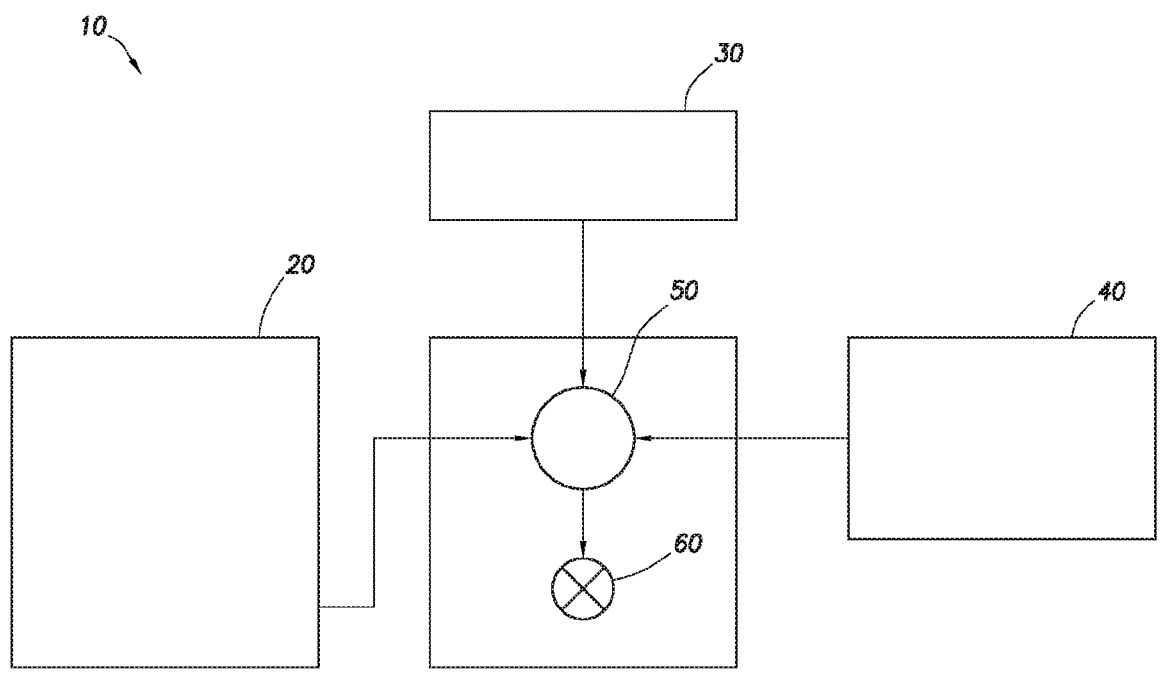
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems, methods, and compositions for treating subterranean formations. More particularly, the present disclosure relates to systems, methods, and compositions for creating microfractures within subterranean formations and delivering microproppant particles into microfractures within subterranean formations.

The present disclosure provides systems, methods, and compositions for creating microfractures within a subterranean formation and delivering microproppant particles into the microfractures and/or the subterranean formation by introducing one or more treatment fluids including a plurality of microproppant particles and a surfactant into the subterranean formation. The microproppant particles of the present disclosure may generally be small particles having a mean particle diameter of about 100 microns or less. The methods of the present disclosure generally include: providing a treatment fluid that includes an aqueous base fluid, a surfactant, and a plurality of microproppant particles; and introducing the treatment fluid into at least a portion of a subterranean formation, for example, in the course of a fracturing treatment. In some embodiments, the methods of the present disclosure may also include introducing another treatment fluid that includes an aqueous base fluid and a surfactant into the subterranean formation prior to the introduction of the treatment fluid including the microproppant particles.

The treatment fluids of the present disclosure may be used in various subterranean applications (for example, the treatment fluids may be used as pre-pad fluids, pad fluids, and/or spacer fluids). In certain embodiments, at least a portion of the subterranean formation into which the treatment fluids may be introduced may be a low-permeability formation, e.g., a formation having a permeability of approximately 1 millidarcy (mD) or less. In certain embodiments, the microproppant particles may enter one or more microfractures within the subterranean formation. The present disclosure also provides systems for preparing the treatment fluids of the present disclosure including the surfactant and the microproppant particles and introducing the treatment fluids into a subterranean formation.

Among the many potential advantages to the systems, methods, and compositions of the present disclosure, only some of which are alluded to herein, the systems, methods, and compositions of the present disclosure may facilitate more effective treatment of regions of a subterranean formation by creating or enhancing microfractures within the subterranean formation and/or delivering microproppant particles into those microfractures. In certain embodiments, the surfactant in the treatment fluids may act as an anti-agglomerant to mitigate flocculation of the microproppant particles in the treatment fluids and, in turn, enhance the suspension and dispersion of the microproppant particles in the treatment fluids. As a result, a greater portion of the microproppant particles in the treatment fluids may enter the microfractures and/or the microproppant particles may penetrate deeper into the microfractures. Thus, in certain embodiments, the systems, methods, and compositions of the present disclosure may help prop or keep the microfractures open when pressure from the fracturing treatment is withdrawn, maintain or increase conductivity of microfractures within tight formations, and/or potentially improve fluid recovery from subterranean formations.

In certain embodiments, the treatment fluids used in the methods of the present disclosure may include an aqueous base fluid. The term "base fluid" refers to the major component of the fluid (as opposed to components dissolved and/or suspended therein) and does not indicate any particular condition or property of that fluids such as its mass, amount, pH, etc. Aqueous base fluids that may be suitable for use in the methods of the present disclosure may include water from any source, and may include any components other than water that do not adversely impact the alkali solution, silicate component, and/or aluminum components used in the particular application of the present disclosure. Such aqueous base fluids may include fresh water, salt water (e.g., water containing one or more salts dissolved therein), brine (e.g., saturated salt water), seawater, or any combination thereof. In some embodiments of the present disclosure, the aqueous base fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art with the benefit of this disclosure will recognize when such density and/or pH adjustments are appropriate.

In certain embodiments, the treatment fluids used in the methods of the present disclosure may include one or more surfactants. Surfactants that may be suitable for use in certain embodiments of the present disclosure include cationic, anionic, zwitterionic, and nonionic surfactants. Examples of cationic surfactants that may be suitable for use in certain embodiments of the present disclosure include, but are not limited to, alkyl amines, alkyl amine salts, quaternary ammonium salts such as trimethyltallowammonium halides (e.g., trimethyltallowammonium chloride, trimethyltallowammonium bromide), amine oxides, alkyltrimethyl amines, triethyl amines, alkyldimethylbenzylamines, cetyltrimethylammonium bromide, alkyl dimethyl benzylammonium chloride, trimethylcocoammonium chloride, derivatives thereof, and combinations thereof. Examples of anionic surfactants that may be suitable for use in certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, $C_8$ to $C_{22}$ alkylethoxylate sulfate, alkylphenol ethoxylate sulfate (or salts thereof), monoalkylphosphates, polyalkylphosphates, fatty acids, alkali salts of fatty acids, glyceride sulfates, sodium salts of fatty acids, soaps, derivatives thereof, and combinations thereof. Examples of amphoteric or zwitterionic surfactants that may be suitable for use in certain embodiments of the present disclosure include, but are not limited to, dihydroxyl alkyl glycinate, alkyl ampho acetate or propionate, alkyl betaine, alkyl amidopropyl betaine and alkylimino mono- or di-propionates derived from certain waxes, fats and oils. Examples of nonionic surfactants that may be suitable for use in certain embodiments of the present disclosure include, but are not limited to, alcohol oxylalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylate, derivatives thereof, and combinations thereof. A person of skill in the art with the benefit of the present disclosure will understand how to select such surfactants that may be suitable for a particular application of the methods and compositions of the present disclosure.

Efficacy of a particular type of surfactant in the methods and compositions of the present disclosure may depend on a number of factors including, but not limited to, characteristics of the subterranean formation, the type of hydrocarbon in the subterranean formation, the total acid number and/or total base number of the hydrocarbon in the subterranean formation, and the other components included the treatment fluid such as the microproppant particles. The efficacy of a surfactant in the methods and compositions of the present disclosure may be evaluated and selected using any surfactant selection method known in the art. Examples of such surfactant selection methods include, but are not limited to, emulsion tendency tests, dynamic surface tension tests, interfacial surface tension tests, oil recovery tests, wettability/imbibition tests, total acid number and/or total base number determination, and/or any combination thereof.

In certain embodiments, a surfactant may be selected for used in the treatment fluids of the present disclosure based on at least one of the electrostatic charge of the subterranean formation in which the treatment fluid may be introduced, the electrostatic charge of a hydrocarbon within the subterranean formation, and/or the electrostatic charge of the microproppant particles included in the treatment fluid with the surfactant. For instance, in some embodiments, a surfactant many be selected to have an electrostatic charge opposite that of one or more the hydrocarbons residing in the subterranean formation in which the treatment fluid is introduced. When head groups of the surfactant have an opposite electrostatic charge from polar compounds in the hydrocarbon in the formation, the surfactant molecules may form ion pairs with these polar compounds through electrostatic interaction. The formation of these ion pairs may, among other effects, strip the absorbed hydrocarbon away from the surfaces of the subterranean formation and make the surfaces water wet, which may enhance hydrocarbon recovery.

In certain embodiments, a surfactant may be selected to have the same electrostatic charge as the rock surfaces residing in the subterranean formation in which the treatment fluid is introduced. For example, a surfactant with a negative electrostatic charge may be selected to treat a subterranean formation that primarily contains sandstone, which tends to be negatively changed. Likewise, a surfactant with a positive electrostatic charge may be selected to treat a subterranean formation that primarily contains carbonate, which tends to be positively charged. In other embodiments, a surfactant may be selected to have an electrostatic charge opposite that of the rock surfaces residing in the subterranean formation in which the treatment fluid is introduced. For example, a surfactant with a positive electrostatic charge may be selected to treat a subterranean formation that primarily contains sandstone, which tends to be negatively changed. Likewise, a surfactant with a negative electrostatic charge may be selected to treat a subterranean formation primarily contains carbonate, which tends to be positively charged. When head groups of the surfactant have an opposite electrostatic charge from the subterranean formation, a high concentration of the surfactant may aggregate within the portion of the treatment fluid in a microfracture to lower the chemical potential of that portion of the treatment fluid. This reduction in chemical potential may produce a differential or osmotic pressure between the portion of the treatment fluid in the microfracture and the remainder of the treatment fluid, which may lead to activation or propagation of additional microfractures.

In certain embodiments, a surfactant may be selected to have an electrostatic charge opposite that of the microproppant particles included in the treatment fluid. When the head groups of the surfactant have an opposite charge from the microproppant particles, they may interact with the surfaces of the microproppant particles to reduce flocculation of those microproppant particles and, thus, may cause the microproppant particles to remain individualized and/or suspended in the treatment fluid for a longer period of time, which may allow the microproppant particles to enter and/or penetrate deeper into microfractures along with the treatment fluid.

In certain embodiments, a weakly emulsifying surfactant may be used, among other reasons, based on its ability to enhance production of oil from subterranean formations. As used herein, the term "weakly emulsifying surfactant" may refer to a surfactant capable of forming an oil-in-water emulsion that readily breaks. In certain embodiments, the weakly emulsifying surfactant may be capable of weakly dispersing oil into water thereby lowering the effective viscosity of the oil and making the interface between the oil and water flexible, which in turn may mobilize the oil to facilitate its movement through tight subterranean formations.

The surfactant may be present in the treatment fluids of the present disclosure in any suitable amount sufficient to attain the benefits and features of the fluid described herein. In certain embodiments, the surfactant may be present in the treatment fluids of the present disclosure in an amount up to about 10 gallons of surfactant per thousand gallons of treatment fluid ("gpt"). In one or more embodiments, the surfactant may be present in the treatment fluid in an amount within a range of from about 3 gpt to about 10 gpt. In other embodiments, the surfactant may be present in the treatment fluid in an amount within a range of from about 3 gpt to about 5 gpt. In one or more embodiments, the surfactant may be present in the treatment fluid in an amount within a range of from about 3 gpt to about 4 gpt, in other embodiments, from about 4 gpt to about 5 gpt, in other embodiments, from about 5 gpt to about 6 gpt, in other embodiments, from about 6 gpt to about 7 gpt, in other embodiments, from about 7 gpt to about 8 gpt, in other embodiments, from about 8 gpt to about 9 gpt, and in other embodiments, from about 9 gpt to about 10 gpt.

In one or more embodiments, the surfactant may be present in the treatment fluid in an amount up to about 3 gpt. In other embodiments, the surfactant may be present in the treatment fluid in an amount within a range of from about 0.5 gpt to about 3 gpt. In one or more embodiments, the surfactant may be present in the treatment fluid in an amount within a range of from about 0.5 gpt to about 1 gpt, in other embodiments, from about 1 gpt to about 1.5 gpt, in other embodiments, from about 1.5 gpt to about 2 gpt, in other embodiments, from about 2 gpt to about 2.5 gpt, and in other embodiments, from about 2.5 gpt to about 3 gpt. As one of ordinary skill in the art with the benefit of this disclosure will recognize, the concentration of the surfactant in the treatment fluid may vary depending on the particular use or type of treatment fluid (for example, pre-pad fluid, pad fluid, or spacer fluid).

For instance, in some embodiments, a pre-pad fluid may be used in conjunction with a pad fluid, and the pre-pad fluid may contain a higher concentration of the surfactant (e.g., from about 3 gpt to about 10 gpt) than the pad fluid (e.g., up to about 3 gpt). When the pre-pad fluid is introduced into the subterranean formation, a high concentration of the surfactant may aggregate near the rock surfaces in the subterranean formation. The introduction of a pad fluid with a lower concentration of surfactant into the subterranean formation may produce a differential or osmotic pressure between the portion of the fluid near the rock surfaces and the portion of the fluid in the remainder of the subterranean formation. This differential or osmotic pressure may cause water from the portion of the fluid in the remainder of the subterranean formation to be drawn toward the rock surfaces, which may lead to creation, activation, enhancement, and/or propagation of microfractures in the rock surfaces upon application of sufficient pressure.

As used herein, the term "pre-pad fluid" refers to a fluid that is used, for example, to fill a casing and tubing inside a wellbore, test a fracturing system for pressure, and/or break down a subterranean formation prior to fracturing. As used herein, the term "pad fluid" refers to a fluid that is used to initiate fracturing. As used herein, the term "spacer fluid" refers to a fluid that used to physically separate one fluid from another.

In certain embodiments, the treatment fluids used in the methods of the present disclosure may include a plurality of microproppant particles, for example, to be placed in microfractures within the subterranean formation. As used herein, the term "plurality" refers in a non-limiting manner to any integer equal or greater than 1. The use of the phrase "plurality of microproppant particles" is not intended to limit the composition of the plurality of microproppant particles or the type, shape, or size, etc. of the microproppant particles within the plurality. For instance, in certain embodiments, the composition of the plurality of microproppant particles may be substantially uniform such that each microproppant particle within the plurality is of substantially similar type, shape, and/or size, etc. In other embodiments, the composition of the plurality of microproppant particles may be varied such that the plurality includes at least one microproppant particle of a particular type, shape, and/or size, etc. and at least one other microproppant particle of a different type, shape, and/or size, etc.

Examples of materials that may be suitable for use as microproppant particles in certain embodiments of the present disclosure include, but are not limited to, fly ash, silica, alumina, fumed carbon (e.g., pyrogenic carbon), carbon black, graphite, mica, titanium dioxide, metal-silicate, silicate, kaolin, talc, zirconia, boron, hollow microspheres (e.g., spherical shell-type materials having an interior cavity), glass, calcined clays (e.g., clays that have been heated to drive out volatile materials), partially calcined clays (e.g., clays that have been heated to partially drive out volatile materials), composite polymers (e.g., thermoset nanocomposites), halloysite clay nanotubes, and any combination thereof. In certain embodiments, microproppant particles may become anchored and/or adhered to fracture faces within the microfracture, which may produce solid masses in the forms of high strength ridges, bumps, patches, or an uneven film on the fracture face. This may, among other benefits, further assist in maintaining the conductivity of the microfractures.

The microproppant particles may be of any shape (regular or irregular) suitable or desired for a particular application. In some embodiments, the microproppant particles may be round or spherical in shape, although they may also take on other shapes such as ovals, capsules, rods, toroids, cylinders, cubes, or variations thereof. In certain embodiments, the microproppant particles of the present disclosure may be relatively flexible or deformable, which may allow them to enter certain perforations, microfractures, or other spaces within a subterranean formation whereas solid particulates of a similar diameter or size may be unable to do so.

In certain embodiments, the plurality of microproppant particles may have a mean particle diameter of about 100 microns or less. In certain embodiments, the plurality of microproppant particles may have a mean particle diameter in a range of from about 0.1 microns to about 100 microns. In one or more embodiments, the plurality of microproppant particles may have a mean particle diameter in a range of from about 0.1 microns to about 50 microns. In one or more embodiments, the plurality of microproppant particles may have a mean particle diameter of about 25 microns or less, in other embodiments, a mean particle diameter of about 10 microns or less, and in other embodiments, a mean particle diameter of about 5 microns or less.

As used herein, the term "diameter" refers to a straight line segment joining two points on the outer surface of the microproppant particle and passing through the central region of the microproppant particle, but does not imply or require that the microproppant particle is spherical in shape or that it have only one diameter. As used herein, the term "mean particle diameter" refers to the sum of the diameter of each microproppant particle in the plurality of microproppant particles divided by the total number of the microproppant particles in the plurality of microproppant particles. The mean particle diameter of the plurality of microproppant particles may be determined using any particle size analyzer known in the art, for example, a Malvern Particle Size Analyzer, available from Malvern Instruments Ltd., of Worcestershire, UK. In certain embodiments, the mean particle diameter of the plurality of microproppant particles may be determined using a representative subset or sample of microproppant particles from the plurality of microproppant particles. A person of skill in the art with the benefit of the present disclosure will understand how to select such a representative subset or sample of microproppant particles from the plurality of microproppant particles.

In certain embodiments, each of the microproppant particles may have particle sizes smaller than 100 mesh (149 microns), and in certain embodiments may have particle sizes equal to or smaller than 200 mesh (74 microns), 230 mesh (63 microns) or even 325 mesh (44 microns). The size and/or diameter of the microproppant particles may be tailored for a particular application based on, for example, the estimated width of one or more microfractures within a subterranean formation in which the microproppant particles are to be used, as well as other factors.

In certain embodiments, the microproppant particles may be present in the treatment fluids of the present disclosure in an amount up to about 10 pounds of microproppant particles per gallon of treatment fluid ("ppg"). In certain embodiments, the microproppant particles may be present in the treatment fluids of the present disclosure in an amount within a range of from about 0.01 ppg to about 10 ppg. In one or more embodiments, the microproppant particles may be present in the treatment fluids of the present disclosure in an amount within a range of from about 0.01 ppg to about 0.1 ppg, in other embodiments, from about 0.1 ppg to about 1 ppg, in other embodiments, from about 1 ppg to about 2 ppg, in other embodiments, from about 2 ppg to about 3 ppg, in other embodiments, from about 3 ppg to about 4 ppg, in other embodiments, from about 4 ppg to about 5 ppg, in other embodiments, from about 5 ppg to about 6 ppg, in other embodiments, from about 6 ppg to about 7 ppg, in other embodiments, from about 7 ppg to about 8 ppg, in other embodiments, from about 8 ppg to about 9 ppg, and in other embodiments, from about 9 ppg to about 10 ppg. In certain embodiments, the microproppant particles may be present in the treatment fluids of the present disclosure in an amount within a range of from about 0.01 ppg to about 0.5 ppg. In one or more embodiments, the microproppant particles may be present in the treatment fluids of the present disclosure in an amount within a range of from about 0.01 ppg to about 0.05 ppg, in other embodiments, from about 0.05 ppg to about 0.1 ppg, in other embodiments, from about 0.1 ppg to about 0.2 ppg, in other embodiments, from about 0.2 ppg to about 0.3 ppg, in other embodiments, from about 0.3 ppg to about 0.4 ppg, and in other embodiments, from about 0.4 ppg to about 0.5 ppg. The concentration of the microproppant particles in the treatment fluid may vary depending on the particular application of the treatment fluid (for example, pre-pad fluid, pad fluid, or spacer fluid). In some embodiments, the treatment fluid (e.g., pre-pad fluid) may not contain any microproppant particles.

In certain embodiments, treatment fluids used in the methods of the present disclosure optionally may include any number of additional additives. Examples of such additional additives include, but are not limited to, salts, additional surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, biocides, friction reducers, antifoam agents, bridging agents, flocculants, $H_2S$ scavengers, $CO_2$ scavengers, oxygen scavengers, lubricants, viscosifying/gelling agents, breakers, weighting agents, relative permeability modifiers, resins, wetting agents, coating enhancement agents, filter cake removal agents, antifreeze agents (e.g., ethylene glycol), proppant particles, and the like. A person skilled in the art, with the benefit of this disclosure, will recognize the types of additives that may be included in the treatment fluids of the present disclosure for a particular application.

In certain embodiments, the treatment fluids of the present disclosure may include, among other components, an aqueous base fluid and a surfactant. In other embodiments, the treatment fluids of the present disclosure may include, among other components, an aqueous base fluid, a surfactant, and a plurality of microproppant particles. In some embodiments, the treatment fluids of the present disclosure may consist and/or consist essentially of an aqueous base fluid, a surfactant, a plurality of microproppant particles, a clay stabilizer, a friction reducer, a biocide, and a scale inhibitor. In other embodiments, the treatment fluids of the present disclosure may consist and/or consist essentially of an aqueous base fluid, a surfactant, and a plurality of microproppant particles. In yet other embodiments, the treatment fluids of the present disclosure may consist and/or consist essentially of an aqueous base fluid and a surfactant.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the aqueous base fluid may be mixed with the surfactant, the microproppant particles, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The present disclosure, in some embodiments, provides methods for using the treatment fluids to carry out a variety of subterranean treatments, including but not limited to, hydraulic fracturing treatments, frac-packing treatment, acid fracturing treatments, and the like. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a wellbore that penetrates the subterranean formation. In certain embodiments, the treatment fluid may be introduced into the subterranean formation using one or more pumps.

In certain embodiments, the treatment fluid (e.g., sometimes called a "pad fluid") may be introduced into a subterranean formation at a pressure sufficient to create or enhance one or more fractures (e.g., primary fractures, cracks, microfractures, and/or microcracks) within the subterranean formation (e.g., hydraulic fracturing). In some embodiments, the pad fluid may introduced into the subterranean formation at or above a pressure sufficient to initiate the formation of at least one microfracture within the subterranean formation. In such embodiments, the pad fluid may be introduced into a portion of the subterranean formation that does not comprise any significant fractures formed therein. In certain embodiments, the pad fluid may be introduced into a portion of the subterranean formation that has not previously been fractured. In certain embodiments, at least a portion of the microproppant particles in the pad fluid may enter a microfracture created or enhanced within the subterranean formation.

In certain embodiments, another treatment fluid (e.g., sometimes called a "pre-pad fluid") may be introduced into the subterranean formation prior to the pad fluid. In such embodiments, the pre-pad fluid may include an aqueous base fluid and a surfactant in accordance with the above disclosure. In some embodiments, the pre-pad fluid does not include any microproppant particles. In some embodiments, the aqueous base fluid in the pre-pad fluid may have substantially the same composition as the aqueous base fluid in the pad fluid. In some embodiments, the surfactant in the pre-pad fluid may have substantially the same composition as the surfactant in the pad fluid. In such embodiments, the surfactant in the pad fluid and the surfactant in the pre-pad fluid may comprise the same surfactant.

In certain embodiments, another treatment fluid (e.g., sometimes called a "fracturing fluid" or "slurry") may be introduced into the subterranean formation after the pad fluid. In such embodiments, the "fracturing fluid" or "slurry" may be introduced into the subterranean formation at a pressure sufficient to create or enhance one or more fractures within the subterranean formation. In such embodiments, the "fracturing fluid" or "slurry" may comprise a plurality of proppant particles having a mean particle diameter greater than about 100 microns. In some embodiments, at least a portion of the proppant particles may enter a fracture created or enhanced within the subterranean formation.

In other embodiments, the treatment fluid (e.g., sometimes called a "spacer fluid") may be introduced between a first fluid and a second fluid. In certain embodiments, a first fluid may be introduced into the subterranean formation, a spacer fluid may be introduced into the subterranean formation after the first fluid, and a second fluid may introduced into the subterranean formation after the spacer fluid. In such embodiments, the spacer fluid may separate the first fluid from the second fluid. In certain embodiments, the first fluid and the second fluid may each include a plurality of proppant particles having a mean particle diameter greater than about 100 microns. In some embodiments, the second fluid may have substantially the same composition as the first fluid. In other embodiments, the composition of the second fluid may vary from the composition of the first fluid (for example, by different components or by different concentrations of the same components). In certain embodiments, the spacer fluid may displace at least a portion of the first fluid present in the subterranean formation. In some embodiments, at least a portion of the microproppant particles in the spacer fluid may enter a microfracture within the subterranean formation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the fracturing system 10 includes an aqueous base fluid source 20, an additive source 30, a microproppant source 40, and a pump and blender system 50 and resides at the surface at a well site where a well 60 is located. The additive source 30 may provide one or more additives (e.g., surfactants, gelling agents, weighting agents, and/or other optional additives) to alter the properties of the treatment fluid. For example, the other additives can be included to reduce pumping friction, to reduce or eliminate the fluid's reaction to the geological formation in which the well is formed, to operate as surfactants, and/or to serve other functions. The microproppant source 40 can include or contain a liquid slurry, emulsion, or concentrate of microproppant particles of the present disclosure for combination with the treatment fluid. The slurry, emulsion, or concentrate of microppant particles may be prepared by any suitable means, either at the site or at an offsite location.

The pump and blender system 50 receives the aqueous base fluid from the aqueous base fluid source 20 and combines it with other components, including microproppant particles from the microproppant source 40 and one or more additives from the additive source 30, to form the treatment fluid. The resulting mixture may be pumped down the well 60 under a pressure sufficient to create or enhance one or more fractures in a subterranean zone, for example, to stimulate production of fluids from the zone. Notably, in certain instances, the aqueous base fluid source 20, the additive source 30, and/or microppant source 40 may be equipped with one or more metering devices (not shown) to control the flow of fluids, additives, and/or microppant particles to the pump and blender system 50. Such metering devices may permit the pump and blender system 50 to source from one, some or all of the different sources at a given time, and may facilitate the preparation of treatment fluids in accordance with the present disclosure using continuous mixing or "on-the-fly" methods. Thus, for example, the pump and blender system 50 can provide just aqueous base fluid into the well at some times, just additives at other times, just microppant particles at other times, and combinations of those components at yet other times.

Figure 2:
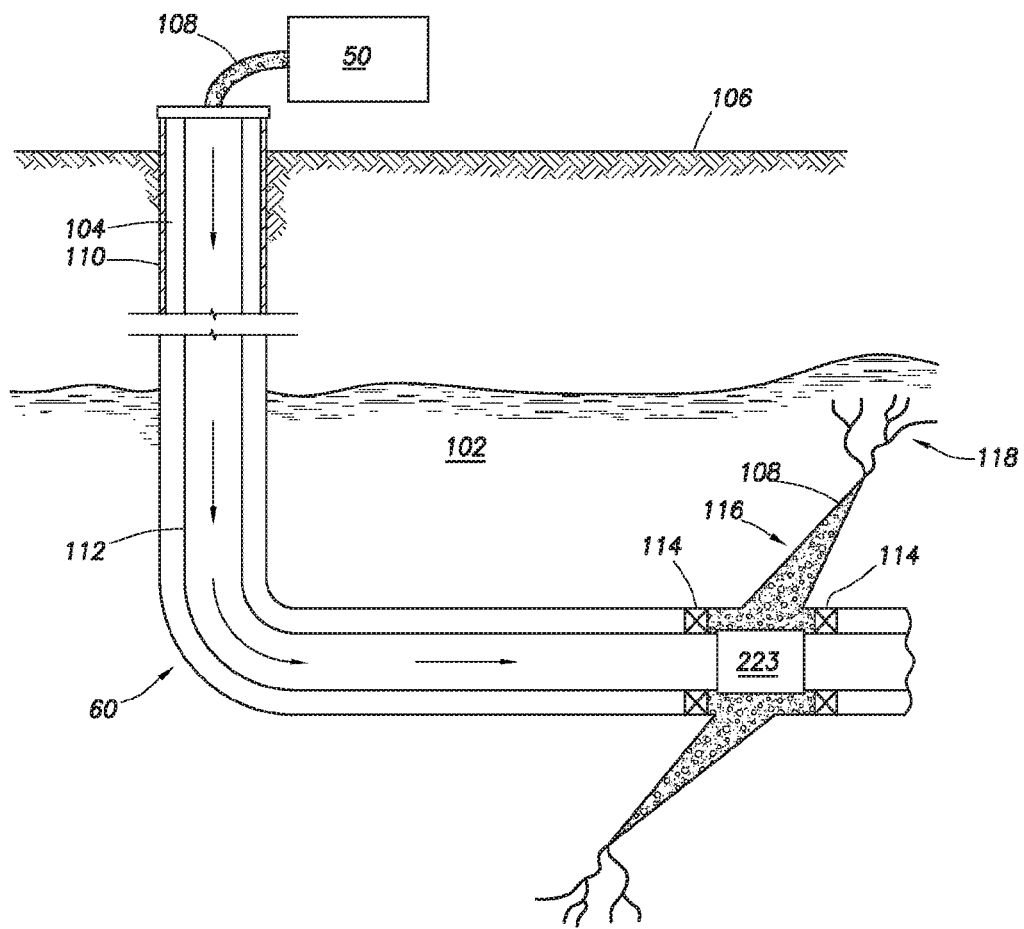
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a wellbore 104. The wellbore 104 extends from the surface 106, and the treatment fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled a work string 112 to pump the treatment fluid 108 into the wellbore 104. The working string 112 may include coiled tubing, jointed pipe, and/or other structures that allow fluid to flow into the wellbore 104. The working string 112 can include flow control devices 223 (e.g., bypass valves, ports, and or other tools or well devices) that control a flow of fluid from the interior of the working string 112 into the subterranean zone 102. For example, the working string 112 may include ports adjacent the wellbore wall to communicate a treatment fluid 108 (e.g., fracturing fluid, pad fluids, pre-pad fluids, spacer fluids, as well as other fluids) directly into the subterranean formation 102, and/or the working string 112 may include ports that are spaced apart from the wellbore wall to communicate treatment fluid 108 and/or other fluids into an annulus in the wellbore between the working string 112 and the wellbore wall.

The working string 112 and/or the wellbore 104 may include one or more sets of packers 114 that seal the annulus between the working string 112 and wellbore 104 to define an interval of the wellbore 104 into which a treatment fluid 108 or other fluids will be pumped. FIG. 2 shows two packers 114, one defining an uphole boundary of the interval and one defining the downhole end of the interval. When a treatment fluid 108 is pumped into the desired interval of the wellbore 104 at or above a certain hydraulic pressure, the rock of the subterranean zone 102 "fractures," in that one or more fractures or cracks are created in the zone or one or more existing fractures or cracks in the zone 102 are enlarged or enhanced. In the embodiments shown, the rock matrix of the subterranean zone 102 is of a type that, when fractured, produces both a primary fracture 116 in the near field and secondary fractures (e.g., induced, dendritic fractures or microfractures) 118 in the far field. The secondary fractures 118 have propagated from or near the ends and edges of the primary fracture 116. In certain instances, the subterranean zone 102 is a low permeability zone having a permeability of 1 mD or less. For example, the subterranean zone 102 can include a shale, tight gas, clay, and/or coal bed formation. In certain instances, the rock matrix of the subterranean zone 102 may include cleating or natural fractures (i.e., those that existed prior to, and were not caused by, a fracture treatment). The natural fractures tend to run generally in a direction that is parallel to the primary fracture 116. The secondary fractures 118 run in many directions including directions non-parallel and, in certain instances, perpendicular to the direction of the primary fracture 116. As a result, the secondary fracture 118 can cross, and thereby link, the natural fractures to the primary fracture 116.

The fracturing treatment may be performed in one or more stages, where different amounts, sizes, and/or concentrations of proppant particles (including microppant particles as well as larger proppant particles) or other additives are provided into the fractures 116, 118. For example, in certain instances, the fractures 116, 118 can be initiated with a pre-pad fluid containing little or no microppant particles followed by a pad fluid containing the microppant particles that fill and prop the secondary fractures 118, and then subsequent stages can provide conventional proppant particles to the fractures 116 in a manner that fills and props the primary fractures 116 open. A spacer fluid including microppant particles may be introduced between the each subsequent stage to displace the treatment fluid from the prior stage and further fill and prop the secondary fractures 118. Given the small size of the dendritic, secondary fractures 118, one or more of the stages may introduce microppant particles such that the particle size is less than the transverse dimension of the fracture when held open under fracturing pressure. Once secondary fractures 118 are created, the microppant particles in treatment fluid 108 may flow into the open space within those fractures. Once the fluid pressure is released or reduced, the secondary fractures 118 may at least partially close on the microppant particles.

While not specifically illustrated herein, the disclosed methods and compositions may also directly or indirectly affect any transport or delivery equipment used to convey the compositions to the fracturing system 10 such as, for example, any conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

In certain embodiments, fracturing treatments also may be performed according to the present disclosure using hydrajetting tools. In these embodiments, a hydrajetting tool having at least one fluid jet forming nozzle may be positioned in the wellbore adjacent the formation to be fractured, and then fluid may be jetted through the nozzle against the formation at a pressure sufficient to form a cavity therein and form one or more fractures (e.g., primary fractures and/or secondary microfractures) in the formation by stagnation pressure in the cavity. In certain embodiments, the jetted fluid and/or a fluid subsequently introduced into the fractures may include one or more microproppant particles of the present disclosure (and, optionally, tackifying agents, and/or other additives discussed above), thereby allowing the microproppant particles to enter the fractures and/or microfractures within the formation. These types of fracturing treatments using a hydrajetting tool may be performed in open holes as well as cased wellbores.

An embodiment of the present disclosure is a method including: providing a treatment fluid that comprises an aqueous base fluid, a surfactant, and a plurality of microproppant particles having a mean particle diameter of about 100 microns or less; introducing the treatment fluid into a subterranean formation at or above a pressure sufficient to initiate the formation of at least one microfracture within the subterranean formation; and allowing at least a portion of the microproppant particles to enter the at least one microfracture within the subterranean formation. In one or more embodiments described in the preceding paragraph, the surfactant is present in the treatment fluid in an amount up to about 3 gpt. In one or more embodiments described above, the plurality of microproppant particles is present in the treatment fluid in an amount up to about 2 ppg. In one or more embodiments described above, the surfactant is a weakly emulsifying surfactant. In one or more embodiments described above, the surfactant is selected based on at least one of: an electrostatic charge of a rock surface within the subterranean formation, an electrostatic charge of a hydrocarbon within the subterranean formation, and an electrostatic charge of the microproppant particles. In one or more embodiments described above, each particle in the plurality of microproppant particles comprises at least one material independently selected from the group consisting of: a fly ash, a silica, an alumina, a fumed carbon, a carbon black, a graphite, a mica, a titanium dioxide, a metal-silicate, a silicate, a kaolin, a talc, a zirconia, a boron, a hollow microsphere, a glass, a calcined clay, a partially calcined clay, a composite polymer, a halloysite clay nanotube, and any combination thereof. In one or more embodiments described above, the treatment fluid further comprises one or more additives selected from the group consisting of: a friction reducer, a clay stabilizer, a biocide, a scale inhibitor, and any combination thereof. In one or more embodiments described above, further comprising introducing a pre-pad fluid comprising a pre-pad aqueous base fluid and a pre-pad surfactant into the subterranean formation prior to introducing the treatment fluid, wherein the pre-pad surfactant is present in the pre-pad fluid in an amount within a range of from about 3 gpt to about 10 gpt. In one or more embodiments described above, the pre-pad aqueous base fluid has substantially the same composition as the aqueous based fluid, and the pre-pad surfactant and the surfactant comprise the same surfactant. In one or more embodiments described above, further comprising introducing a second treatment fluid comprising a plurality of proppant particles having a mean particle diameter greater than about 100 microns.

Another embodiment of the present disclosure is a method including: introducing a pre-pad fluid comprising a first aqueous base fluid and a first surfactant into at least a portion of a subterranean formation, wherein the first surfactant is present in the pre-pad fluid in an amount within a range of from about 3 gpt to about 10 gpt; introducing a pad fluid comprising a second aqueous base fluid, a second surfactant, and a plurality of microproppant particles into the subterranean formation at or above a pressure sufficient to create or enhance at least one microfracture within the subterranean formation, wherein the pad fluid comprises the second surfactant in an amount up to about 3 gpt, and wherein the plurality of microproppant particles has a mean particle diameter of about 100 microns or less; and allowing one or more of the microproppant particles to enter the at least one microfracture within the subterranean formation.

In one or more embodiments described in the preceding paragraph, the plurality of microproppant particles is present in the pad fluid in an amount up to about 2 ppg. In one or more embodiments described above, the first surfactant and the second surfactant comprise the same surfactant. In one or more embodiments described above, the first aqueous base fluid has substantially the same composition as the second aqueous base fluid.

Another embodiment of the present disclosure is a method including: introducing a spacer fluid comprising an aqueous base fluid, a surfactant, and a plurality of microproppant particles into at least a portion of a subterranean formation having at least one microfracture, wherein the plurality of microproppant particles has a mean particle diameter of about 100 microns or less, wherein the spacer fluid displaces at least a portion of a first fluid present in the subterranean formation, and wherein at least a portion of the microproppant particles enters the at least one microfracture.

In one or more embodiments described in the preceding paragraph, the first fluid comprises a first plurality of proppant particles having a mean particle diameter greater than about 100 microns. In one or more embodiments described above, further comprising introducing a second fluid into the subterranean formation, wherein the spacer fluid separates the first fluid from the second fluid. In one or more embodiments described above, the second fluid comprises a second plurality of proppant particles having a mean particle diameter greater than about 100 microns. In one or more embodiments described above, the surfactant is present in the spacer fluid in an amount up to about 3 gpt. In one or more embodiments described above, the plurality of microproppant particles is present in the spacer fluid in an amount up to about 1 ppg.

EXAMPLES

To facilitate a better understanding of the present disclosure, the following examples of certain aspects of certain embodiments are given. The following examples are not the only examples that could be given according to the present disclosure and are not intended to limit the scope of the disclosure or claims.

Example 1

A first treatment fluid was prepared using 100 ml of deionized water, 2 gpt of a commercially available mixture of nonionic and anionic surfactants, and 0.01 ppg of N-200 ceramic microproppant particles, which are commercially available from Zeeospheres Ceramics, LLC in Lockport, La.

A second treatment fluid was prepared using 100 ml of deionized water and 0.1 ppg of N-200 ceramic microproppant particles.

Figure 3:
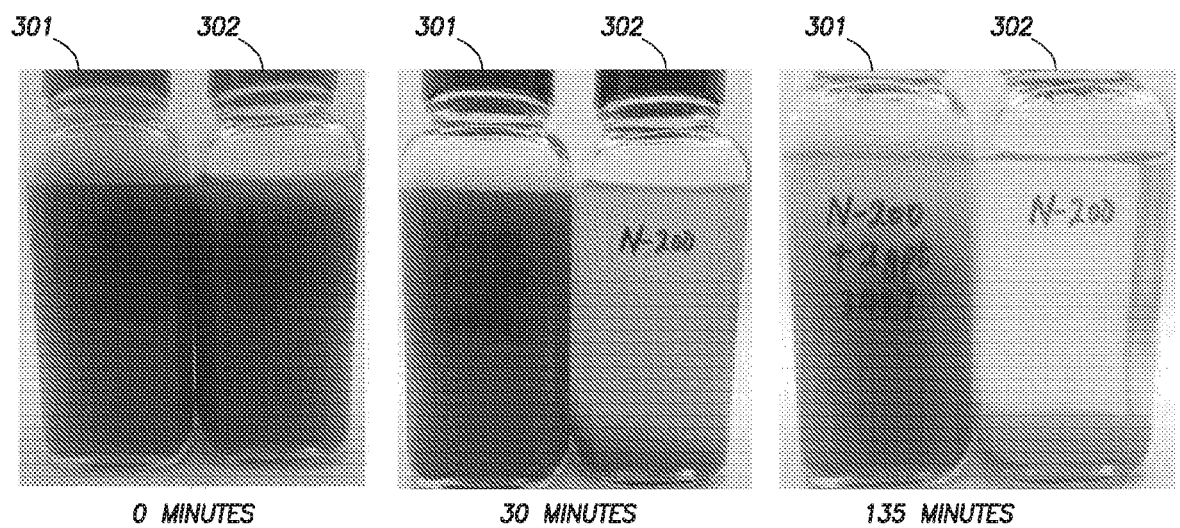
FIG. 3 is a series of photographs illustrating the suspension and dispersion of microproppant particles in treatment fluids in accordance with certain embodiments of the present disclosure.

As shown in FIG. 3, a portion of the first treatment fluid 301 and a portion of the second treatment fluid 302 were placed into two bottles. Both bottles were shaken for 60 seconds to disperse the microproppant particles in the water and then maintained at ambient temperature for 135 minutes. Initially, the microproppant particles were similarly dispersed in the first treatment fluid 301 and the second treatment fluid 302. After 30 minutes, the microproppant particles began to settle in the second treatment fluid 302 while the majority of the microproppant particles remained suspended and dispersed in the first treatment fluid 301. After 135 minutes, nearly all of the microproppant particles in the second treatment fluid 302 settled while a significant portion of the microproppant particles remained suspended and dispersed in the first treatment fluid 301.

Figure 4:
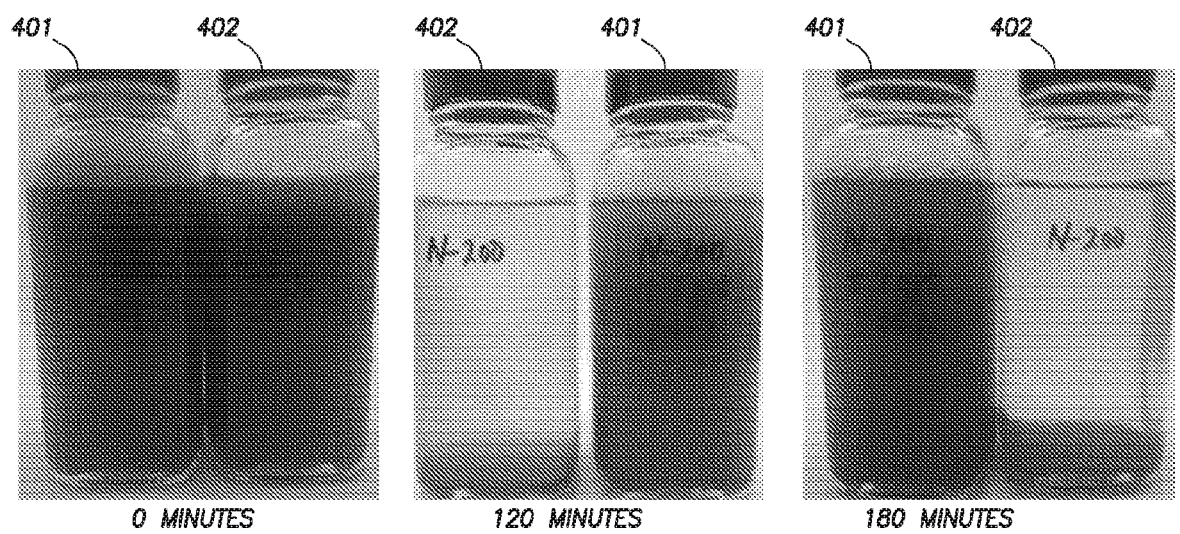
FIG. 4 is a series of photographs illustrating the suspension and dispersion of microproppant particles in treatment fluids in accordance with certain embodiments of the present disclosure.

As shown in FIG. 4, the remaining portions of each the first treatment fluid 401 and the second treatment fluid 402 were placed into two additional bottles. These bottles were shaken for 60 seconds to disperse the microproppant particles in the water and then maintained at 80° C. (176° F.) for 180 minutes. Initially, the microproppant particles were similarly dispersed in the first treatment fluid 401 and the second treatment fluid 402. After 120 minutes, the microproppant particles began to settle in the second treatment fluid 402 while the majority of the microproppant particles remained suspended and dispersed in the first treatment fluid 401. After 180 minutes, nearly all of the microproppant particles in the second treatment fluid 402 settled while a significant portion of the microproppant particles remained suspended and dispersed in the first treatment fluid 401.

Thus, Example 1 demonstrates the ability of surfactant in the treatment fluids of the present disclosure to act as an anti-agglomerant to mitigate flocculation of the microproppant particles in the treatment fluids and enhance the suspension and dispersion of the microproppant particles in the treatment fluids at both ambient and elevated temperatures for an extended period of time.

Example 2

Figure 5A:
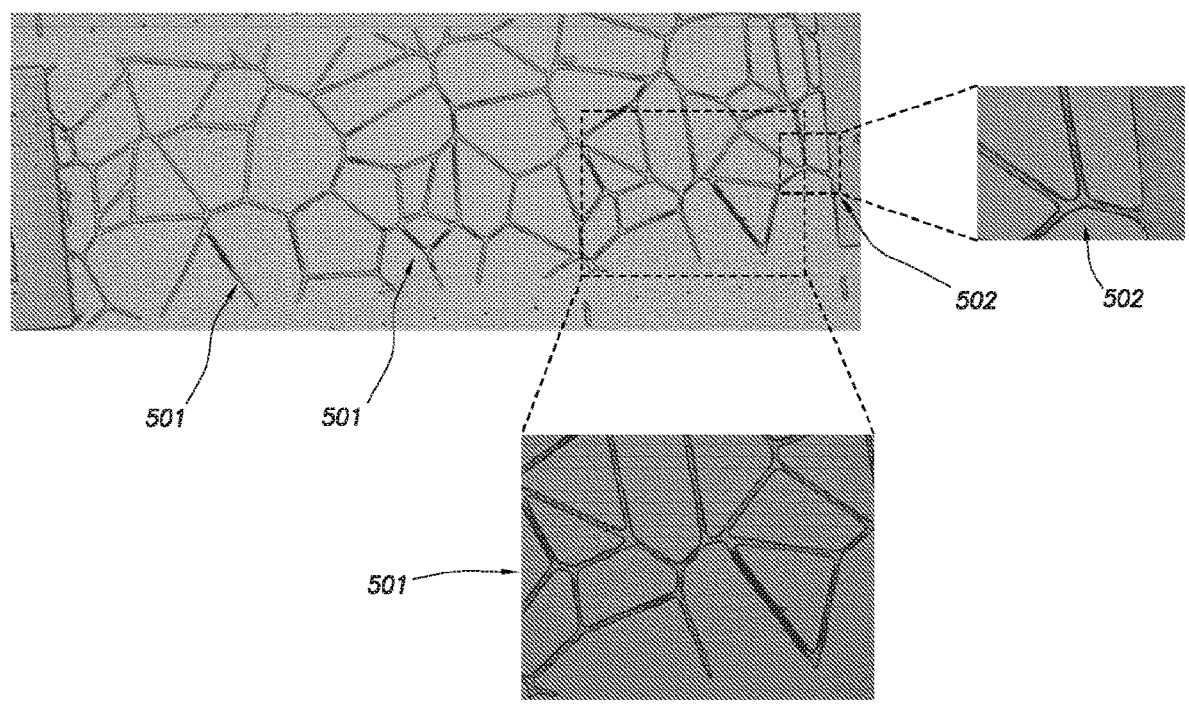
FIGS. 5A and 5B are images illustrating simulated subterranean formations in which microproppant particles have entered into microfractures therein in accordance with certain embodiments of the present disclosure.
Figure 5B:
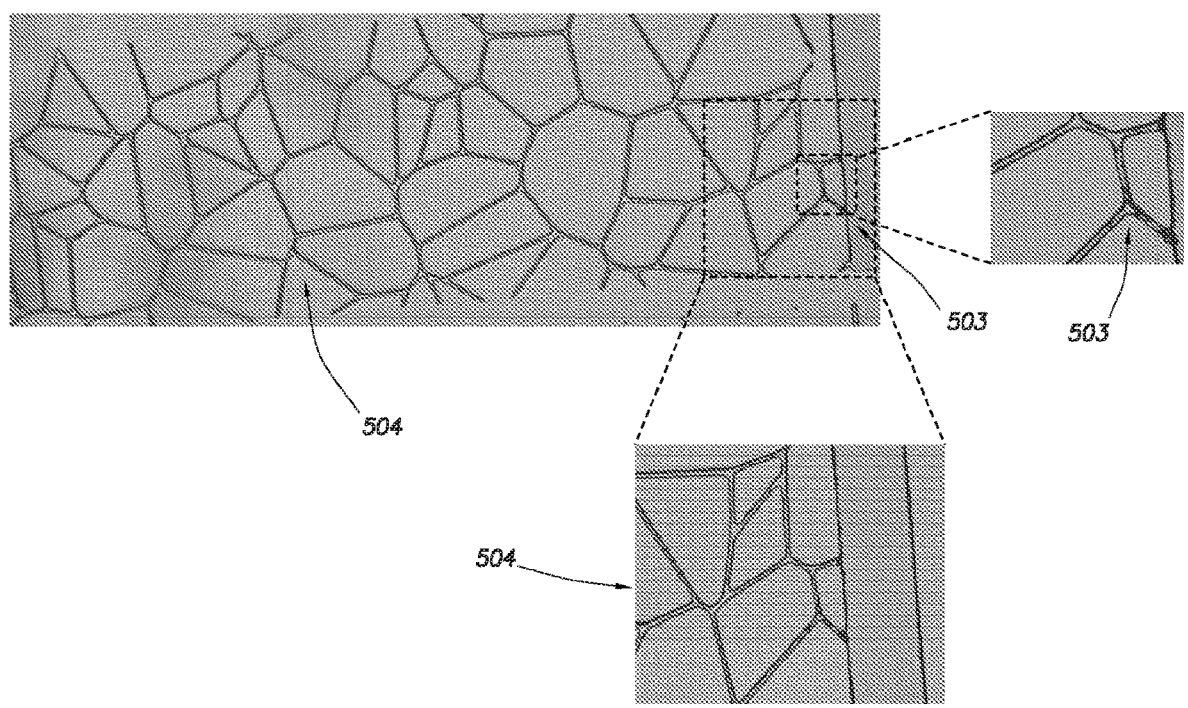

The first and second treatment fluids of Example 1 were each placed into a matrix containing channels having a diameter of about 7 microns to simulate microfractures within a subterranean formation as shown in FIGS. 5A and 5B, respectively. The matrixes were maintained at ambient temperature. The treatment fluids were placed in Tygon microbore tubing (00.010×0.030 in. OD, 100 ft/roll) stationed 1.6 ft high, which provided a hydrostatic pressure of about 0.7 psi to drive the treatment fluids containing microproppant particles into the channels.

As shown in FIG. 5A, the first treatment fluid including the surfactant penetrated into the channels and deposited microproppant particles deep into the matrix (501). The microproppant particles did not block the entrance of the matrix (502). In contrast, the microproppant particles flocculated in the second treatment fluid that did not include a surfactant. As shown in FIG. 5B, the microproppant particles in the second treatment fluid were too large to fit into the channels as a result of the flocculation, and thus, the microproppant particles were deposited at the entrance of the channels (503) rather than inside the matrix (504).

Thus, Example 2 demonstrates the ability of the surfactant in the treatment fluids of the present disclosure to act as an anti-agglomerant to mitigate flocculation of the microproppant particles in the treatment fluids and enhance the ability of the microproppant particles to enter and/or penetrate deeper into microfractures within a subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   selecting a surfactant based, at least in part, on the electrostatic charge of a rock surface within a subterranean formation, wherein the surfactant comprises an electrostatic charge opposite to the rock surface within the subterranean formation;
   providing a treatment fluid that comprises an aqueous base fluid, the surfactant, and the plurality of microproppant particles, wherein the plurality of microproppant particles have a mean particle diameter of about 100 microns or less;
   introducing the treatment fluid into the subterranean formation at or above a pressure sufficient to initiate the formation of at least one microfracture within the subterranean formation; and
   allowing at least a portion of the microproppant particles to enter the at least one microfracture within the subterranean formation.

2. The method of claim 1 wherein the surfactant is present in the treatment fluid in an amount up to about 3 gpt.

3. The method of claim 1 wherein the plurality of microproppant particles is present in the treatment fluid in an amount up to about 2 ppg.

4. The method of claim 1 wherein the surfactant is a weakly emulsifying surfactant.

5. The method of claim 1 wherein each particle in the plurality of microproppant particles comprises at least one material independently selected from the group consisting of: a fly ash, a silica, an alumina, a fumed carbon, a carbon black, a graphite, a mica, a titanium dioxide, a metal-silicate, a silicate, a kaolin, a talc, a zirconia, a boron, a hollow microsphere, a glass, a calcined clay, a partially calcined clay, a composite polymer, a halloysite clay nanotube, and any combination thereof.

6. The method of claim 1 wherein the treatment fluid further comprises one or more additives selected from the group consisting of: a friction reducer, a clay stabilizer, a biocide, a scale inhibitor, and any combination thereof.

7. The method of claim 1 further comprising introducing a pre-pad fluid comprising a pre-pad aqueous base fluid and a pre-pad surfactant into the subterranean formation prior to introducing the treatment fluid, wherein the pre-pad surfactant is present in the pre-pad fluid in an amount within a range of from about 3 gpt to about 10 gpt.

8. The method of claim 7 wherein the pre-pad aqueous base fluid has substantially the same composition as the aqueous based fluid, and wherein the pre-pad surfactant and the surfactant comprise the same surfactant.

9. The method of claim 1 further comprising introducing a second treatment fluid comprising a plurality of proppant particles having a mean particle diameter greater than about 100 microns.

10. The method of claim 1, further comprising selecting the surfactant based, at least in part, on the electrostatic charge of at least one of a hydrocarbon within the subterranean formation and a plurality of microproppant particles.

11. The method of claim 10, wherein the surfactant comprises an electrostatic charge opposite to the hydrocarbon within the subterranean formation and to the plurality of microproppant particles.

12. A method comprising:
   introducing a pre-pad fluid comprising a first aqueous base fluid and a first surfactant into at least a portion of a subterranean formation, wherein the first surfactant is present in the pre-pad fluid in an amount within a range of from about 3 gpt to about 10 gpt, wherein the first surfactant comprises an electrostatic charge opposite to a rock surface within the at least a portion of a subterranean formation;
   introducing a pad fluid comprising a second aqueous base fluid, a second surfactant, and a plurality of microproppant particles into the subterranean formation at or above a pressure sufficient to create or enhance at least one microfracture within the subterranean formation, wherein the pad fluid comprises the second surfactant in an amount up to about 3 gpt, wherein the plurality of microproppant particles has a mean particle diameter of about 100 microns or less, wherein the second surfactant comprises an electrostatic charge opposite to the plurality of microproppant particles, and wherein a differential or osmotic pressure is produced between at least a portion of the pre-pad fluid in the at least one microfracture and at least a portion of the pad fluid within the subterranean formation; and
   allowing one or more of the microproppant particles to enter the at least one microfracture within the subterranean formation.

13. The method of claim 12 wherein the plurality of microproppant particles is present in the pad fluid in an amount up to about 2 ppg.

14. The method of claim 12 wherein the first aqueous base fluid has substantially the same composition as the second aqueous base fluid.

15. The method of claim 12 wherein the first surfactant and the second surfactant comprise the same surfactant.

16. A method comprising:
   introducing a first fluid into a subterranean formation;
   introducing a spacer fluid comprising an aqueous base fluid, a surfactant, and a plurality of microproppant particles into at least a portion of the subterranean formation having at least one microfracture,
      wherein the plurality of microproppant particles has a mean particle diameter of about 100 microns or less,
      wherein the spacer fluid displaces at least a portion of the first fluid present in the subterranean formation, and
      wherein at least a portion of the microproppant particles enters the at least one microfracture;
   selecting the surfactant based, at least in part, on an electrostatic charge of a rock surface within the subterranean formation, wherein the surfactant comprises an electrostatic charge opposite to the rock surface within the subterranean formation; and
   introducing a second fluid into the subterranean formation, wherein the spacer fluid separates the first fluid from the second fluid.

17. The method of claim 16 wherein the first fluid comprises a first plurality of proppant particles having a mean particle diameter greater than about 100 microns.

18. The method of claim 16 wherein the second fluid comprises a second plurality of proppant particles having a mean particle diameter greater than about 100 microns.

19. The method of claim 16 wherein the surfactant is present in the spacer fluid in an amount up to about 3 gpt.

20. The method of claim 16 wherein the plurality of microproppant particles is present in the spacer fluid in an amount up to about 1 ppg.

* * * * *